United States Patent
Kim

(10) Patent No.: US 9,634,300 B2
(45) Date of Patent: Apr. 25, 2017

(54) SECONDARY BATTERY COMPRISING REINFORCEMENT PART AND GASKET

(71) Applicant: Samsung SDI Co., Ltd., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 14/251,538

(22) Filed: Apr. 11, 2014

(65) Prior Publication Data

US 2015/0147636 A1 May 28, 2015

(30) Foreign Application Priority Data

Nov. 22, 2013 (KR) .................. 10-2013-0143245

(51) Int. Cl.

| H01M 2/02 | (2006.01) |
|---|---|
| H01M 2/26 | (2006.01) |
| H01M 2/06 | (2006.01) |
| H01M 2/18 | (2006.01) |
| H01M 10/04 | (2006.01) |

(52) U.S. Cl.
CPC .............. *H01M 2/06* (2013.01); *H01M 2/18* (2013.01); *H01M 2/26* (2013.01); *H01M 10/0413* (2013.01); *H01M 10/0431* (2013.01)

(58) Field of Classification Search
CPC ...... H01M 2/0207; H01M 2/263; H01M 2/34; H01M 2/347; H01M 2/26; H01M 2/06; H01M 10/0413; H01M 10/0431
See application file for complete search history.

(56) References Cited

U.S. PATENT DOCUMENTS

| 2011/0039152 A1 | 2/2011 | Kim et al. |
| 2011/0250491 A1* | 10/2011 | Kim ............... H01M 2/0207 |
| | | 429/176 |
| 2011/0305928 A1 | 12/2011 | Kim et al. |

(Continued)

FOREIGN PATENT DOCUMENTS

| EP | 2 541 650 A1 | 1/2013 |
| EP | 2 645 453 A1 | 10/2013 |

(Continued)

OTHER PUBLICATIONS

Machine Translation of: Fukushi (JP 2012/038529), Feb. 23, 2012.*

(Continued)

*Primary Examiner* — Kenneth Douyette
(74) *Attorney, Agent, or Firm* — Lewis Roca Rothgerber Christie LLP

(57) ABSTRACT

A secondary battery includes a case; a cap plate coupled to the case; at least one electrode assembly accommodated in the case, the electrode assembly including a positive electrode plate, a negative electrode plate, and a separator located between the positive and negative electrode plates; an electrode collector electrically connected to the electrode assembly; an electrode terminal connected to the electrode collector and protruding outward from the cap plate; a gasket surrounding the electrode terminal; and a reinforcement part coupled to the gasket such that at least a portion of the electrode collector is located between the reinforcement part and the gasket.

16 Claims, 6 Drawing Sheets

(56) References Cited

U.S. PATENT DOCUMENTS

2012/0237817 A1* 9/2012 Kim .................. H01M 2/26
429/158
2013/0260221 A1 10/2013 Yoshitake et al.

FOREIGN PATENT DOCUMENTS

| JP | 2012-38529 | 2/2012 |
| KR | 10-2012-0106539 A | 9/2012 |
| WO | WO 2012/090744 A1 | 7/2012 |

OTHER PUBLICATIONS

EPO Search Report dated Apr. 23, 2015, for corresponding European Patent application 14172277.7, (4 pages).
English machine translation of Japanese Publication 2012-38529 dated Feb. 23, 2012, listed above, (33 pages).
KIPO Registration Determination Certificate dated Feb. 3, 2017, for corresponding Korean Patent Application No. 10-2013-0143245 (2 pages).

* cited by examiner

SECONDARY BATTERY COMPRISING REINFORCEMENT PART AND GASKET

CROSS-REFERENCE TO RELATED APPLICATION

This application claims priority to and the benefit of Korean Patent Application No. 10-2013-0143245, filed on Nov. 22, 2013, in the Korean Intellectual Property Office, the disclosure of which is incorporated herein in its entirety by reference.

BACKGROUND

1. Field

One or more embodiments of the present invention relate to a secondary battery.

2. Description of the Related Art

Secondary batteries are rechargeable batteries and are widely used in small mobile devices such as smart phones, very slim laptop computers, tablet personal computers, personal digital assistants, camcorders, and digital cameras, or medium and large electronic devices such as electric vehicles, hybrid electric vehicles, electric bicycles, uninterruptible power supplies (UPSs), and energy storage systems (ESSs).

Several tens of secondary batteries connected in series or parallel may be used in a medium or large electronic device. Because secondary batteries are rechargeable, some secondary batteries are used for long periods of time and therefore are designed to stably maintain mechanical and electric connections of elements of the secondary batteries.

SUMMARY

One or more embodiments of the present invention include a structurally stable secondary battery.

Additional aspects will be set forth in part in the description which follows and, in part, will be apparent from the description, or may be learned by practice of the presented embodiments.

According to one or more embodiments of the present invention, a secondary battery includes: a case in which an opening is formed; a cap plate coupled to the case; at least one electrode assembly located in the case, the electrode assembly including a positive electrode plate, a negative electrode plate, and a separator located between the positive and negative electrode plates; an electrode collector electrically connected to the electrode assembly; an electrode terminal connected to the electrode collector and protruding outward from the cap plate; a gasket surrounding the electrode terminal; and a reinforcement part coupled to the gasket in a state that at least a portion of the electrode collector is located between the reinforcement part and the gasket.

At least one first opening may be formed in the gasket, at least one hook may be formed on the reinforcement part, and the hook may penetrate the first opening and may be coupled to the gasket.

An inner space may be formed in the gasket, and the hook may be coupled to an outer surface of the gasket after passing through the first opening from the inner space.

At least one gasket protrusion may be formed on the gasket, at least one second opening may be formed in the reinforcement part, and the gasket protrusion may be coupled to the second opening.

The gasket protrusion may protrude from an inner wall of the gasket.

The second opening may be formed in a surface of the reinforcement part on which the hook is formed.

The reinforcement part may surround at least a portion of the electrode collector.

The reinforcement part may be insert-molded on the electrode collector.

The electrode collector may include at least a bent portion, and the reinforcement part may be molded to include the bent portion.

A hook and a hook coupling opening may respectively be formed on the electrode collector and the reinforcement part and may be coupled to each other.

A guide and a guide groove may respectively be formed on the electrode collector and the reinforcement part and may be coupled to each other through sliding.

The electrode terminal may penetrate a terminal opening formed in the cap plate and protrude outward from the cap plate, and the gasket may be located between an outer surface of the electrode terminal and an inner surface of the cap plate in which the terminal opening is formed.

An insulator may further be located between the electrode collector and the electrode assembly.

The gasket may include a gasket housing and a seal, the seal being coupled to the gasket housing and surrounding the electrode terminal, the gasket housing including at least one first opening; the reinforcement part may include a body and at least one hook protruding from an edge thereof; and the reinforcement part may be coupled to the gasket by inserting the hook through the first opening and fixing the hook to the gasket housing.

An inner space may be formed in the gasket housing, and the hook may be coupled to an outer surface of the gasket housing after passing through the first opening from the inner space.

At least one gasket protrusion may be formed on the gasket housing, at least one second opening may be formed in the body, and the gasket protrusion may be coupled to the second opening.

The gasket protrusion may protrude from an inner wall of the gasket housing.

The second opening may be formed in a surface of the body on which the hook is formed.

The reinforcement part may be insert-molded on the electrode collector.

The electrode collector may include a first portion and a second portion, the first portion being substantially parallel with the cap plate and electrically connected to the electrode terminal, the second portion being bent from the first portion and connected to the electrode assembly, wherein the reinforcement part may surround a third portion of the electrode collector connecting the first and second portions.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
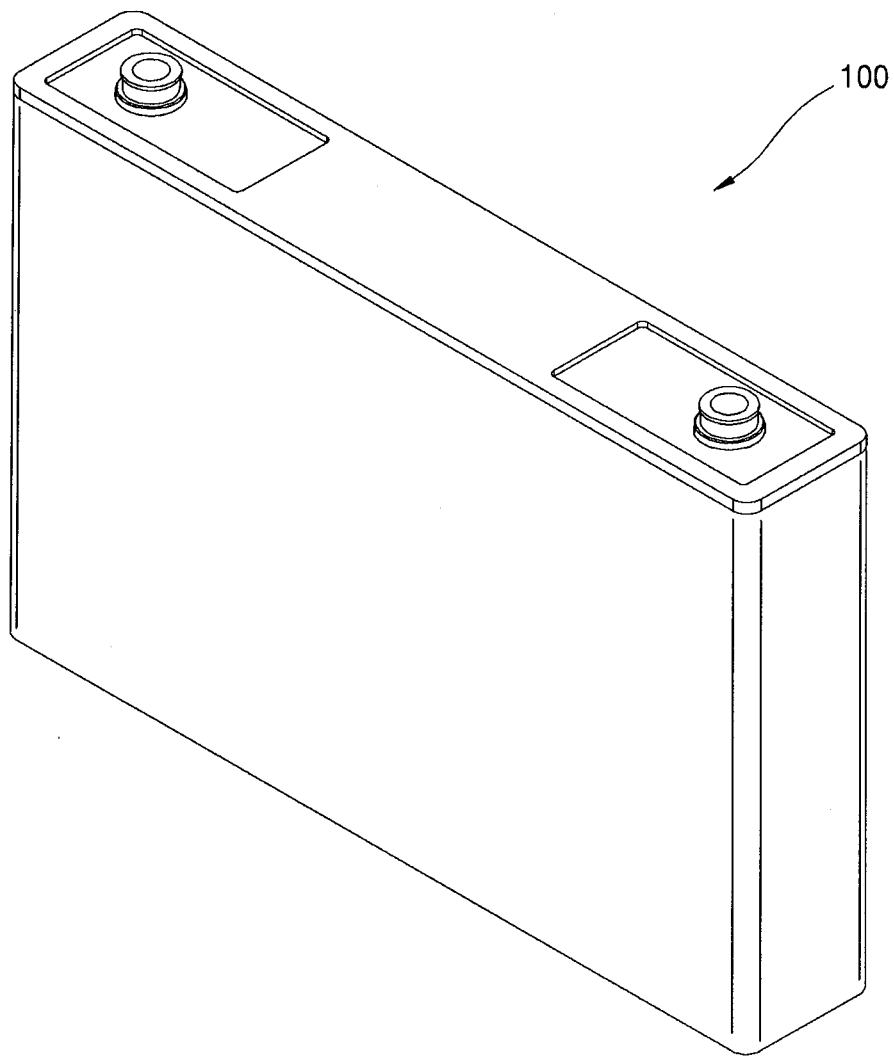
FIG. 1 is a perspective view illustrating a secondary battery according to an embodiment of the present invention.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the present invention.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the present invention. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof.

Hereinafter, a secondary battery will be described in detail according to an embodiment with reference to the accompanying drawings. In the drawings, like reference numerals denote like elements, and overlapping descriptions thereof will be omitted.

Figure 2:
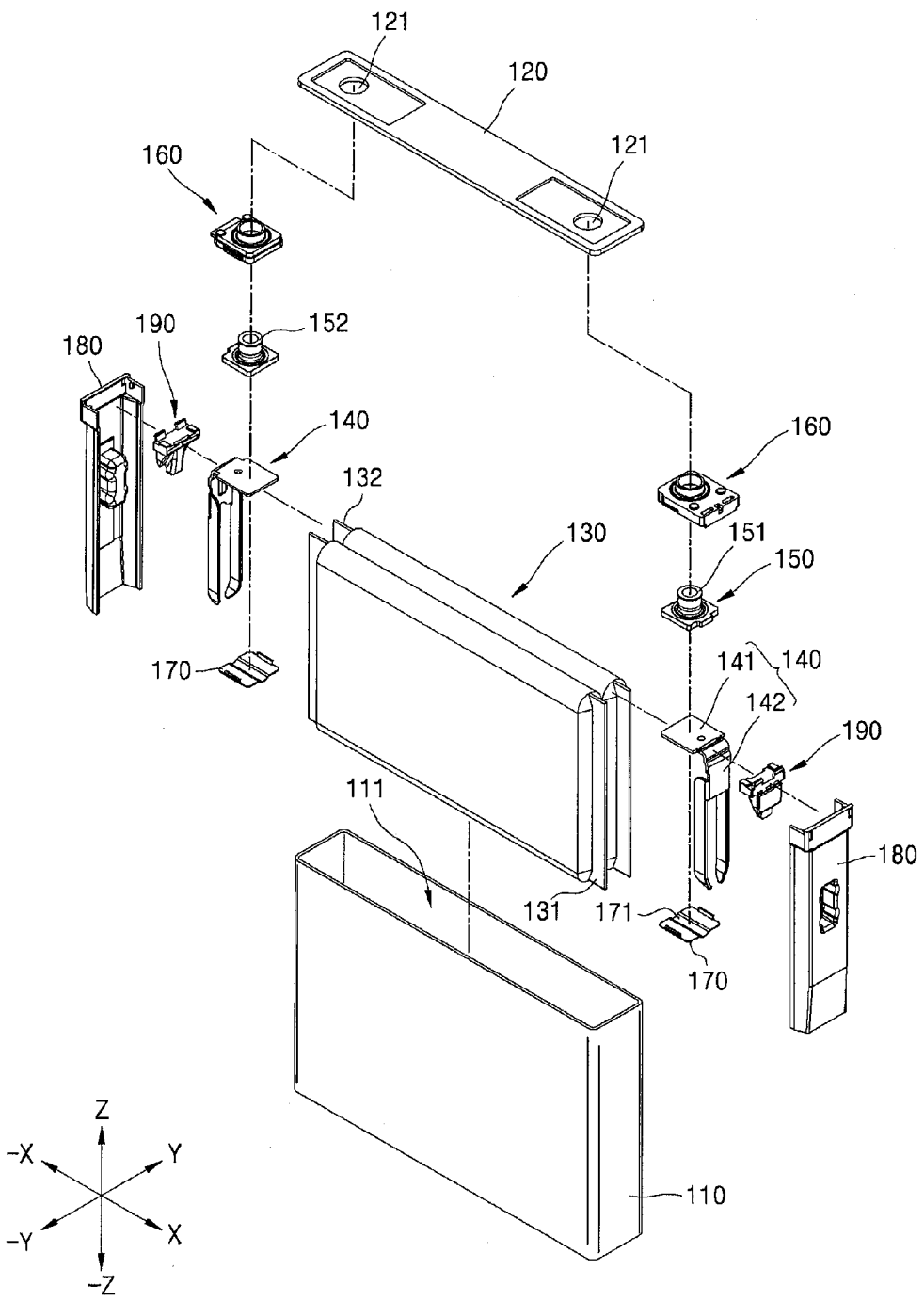
FIG. 2 is an exploded perspective view illustrating the secondary battery of FIG. 1.

FIG. 1 is a view illustrating a secondary battery 100 according to an embodiment of the present invention, and FIG. 2 is an exploded perspective view illustrating the secondary battery 100 of FIG. 1.

Referring to FIGS. 1 and 2, the secondary battery 100 includes a case 110, a cap plate 120, electrode assemblies 130, electrode collectors 140, electrode terminals 150, gaskets 160, insulators 170, and retainers 180.

The case 110 has a hollow rectangular hexahedral shape. An opening 111 is formed in a side of the case 110 to receive the electrode assemblies 130. To ensure the strength of the case 110, the case 110 may be formed of a metallic material. For example, the case 110 may be formed of aluminum or an aluminum alloy.

The electrode assemblies 130 are inserted into the case 110 through the opening 111. One or more electrode assemblies 130 may be arranged in a y-axis direction.

Each of the electrode assemblies 130 includes a positive electrode plate, a negative electrode plate, and a separator between the positive electrode plate and the negative electrode plate. The positive electrode plate includes a positive electrode coating portion formed by coating foil such as aluminum foil with a positive electrode active material, and a positive electrode non-coating portion which a portion of the foil not coated with the positive electrode active material. The negative electrode plate includes a negative electrode coating portion formed by coating foil such as copper foil with a negative electrode active material, and a negative electrode non-coating portion which is a portion of the foil not coated with the negative electrode active material.

The positive electrode plate, the separator, and the negative electrode plate are sequentially stacked and wound in a jelly-roll shape to form each of the electrode assemblies 130.

In one embodiment, the positive electrode non-coating portion and the negative electrode non-coating portion may be exposed in opposite directions. For example, as shown in FIG. 2, the positive electrode non-coating portion and the negative electrode non-coating portion may be exposed at both sides in positive and negative x-axis directions. The positive electrode non-coating portion exposed in the positive x-axis direction may be a positive electrode 131 of each of the electrode assemblies 130, and the negative electrode non-coating portion exposed in the negative x-axis direction may be a negative electrode 132 of each of the electrode assemblies 130.

In the current embodiment, each of the electrode assemblies 130 is formed by winding the positive electrode plate, the second, and the negative electrode plate. However, the electrode assemblies 130 are not limited thereto. In another embodiment, a negative electrode plate, a separator, and a positive electrode plate may be sequentially stacked to form a stacking type electrode assembly.

The cap plate 120 is coupled to the case 110 to seal the opening 111. Like the case 110, the cap plate 120 may be formed of a metallic material such as aluminum or an aluminum alloy. Further, a plurality of terminal openings 121 may be formed in the cap plate 120.

The electrode terminals 150 include: a positive electrode terminal 151 functioning as a positive electrode of the secondary battery 100; and a negative electrode terminal 152 functioning as a negative electrode of the secondary battery 100. Portions of the electrode terminals 150 penetrate the terminal openings 121 of the cap plate 120 and protrude outward from the cap plate 120.

The gaskets 160 surround at least portions of the electrode terminals 150. Portions of the gaskets 160 are located between outer surfaces of the electrode terminals 150 and inner surfaces of the cap plate 120 in which the terminal openings 121 are formed. The gaskets 160 are formed of an insulation material. The gaskets 160 may fill small gaps formed between the cap plate 120 and the electrode terminals 150 and may insulate the cap plate 120 and the electrode terminals 150 from each other.

The electrode collectors 140 electrically connect the electrode terminals 150 and the electrode assemblies 130. The electrode collectors 140 include: first portions 141 substantially parallel with the cap plate 120; and second portions 142 bent and extending from the first portions 141.

The first portions 141 of the electrode collectors 140 may contact lower surfaces of the electrode terminals 150 for electric connection with the electrode terminals 150, and the second portions 142 of the electrode collectors 140 may contact the non-coating portions of the electrode assemblies 130 (that is, the positive electrodes 131 and the negative electrodes 132 of the electrode assemblies 130) for electric connection with the electrode assemblies 130. The second portions 142 of the electrode collectors 140 may be electrically connected to the positive electrodes 131 and the negative electrodes 132 of the electrode assemblies 130 by welding.

In the current embodiment, the number of the electrode assemblies 130 is two. The number of the second portions 142 of the electrode collectors 140 may correspond to the number of the positive electrodes 131 and the negative electrodes 132 of the electrode assemblies 130 so that the second portions 142 may contact the positive electrodes 131 and the negative electrodes 132, respectively. That is, the number of the second portions 142 of the electrode collectors 140 may be varied according to the number of the electrode assemblies 130.

The insulators 170 may be located between the electrode assemblies 130 and the electrode collectors 140 to electrically insulate the electrode assemblies 130 and the electrode collectors 140 from each other. The insulators 170 are located under the electrode collectors 140 to cover lower surfaces of the electrode collectors 140. For example, the insulators 170 may cover lower surfaces of the first portions 141 of the electrode collectors 140.

The insulators 170 provide flow passages through which electrolyte may flow. Portions of the insulators 170 may protrude downward to form protrusions 171. Gaps (that is, flow passages) may be formed between the first portions 141 of the electrode collectors 140 and the protrusions 171.

The retainers 180 electrically insulate the electrode collectors 140 and the case 110 from each other. The retainers 180 may fix the positions of the electrode collectors 140. The retainers 180 may be located between outer surfaces of the electrode collectors 140 and inner surfaces of the case 110 and fix the positions of the positive electrodes 131 and the negative electrodes 132.

The secondary battery 100 includes reinforcement parts 190. The reinforcement parts 190 are coupled to the gaskets 160 with at least portions of the electrode collectors 140 being located therebetween, so as to stably maintain mechanical and electric connections.

Figure 3:
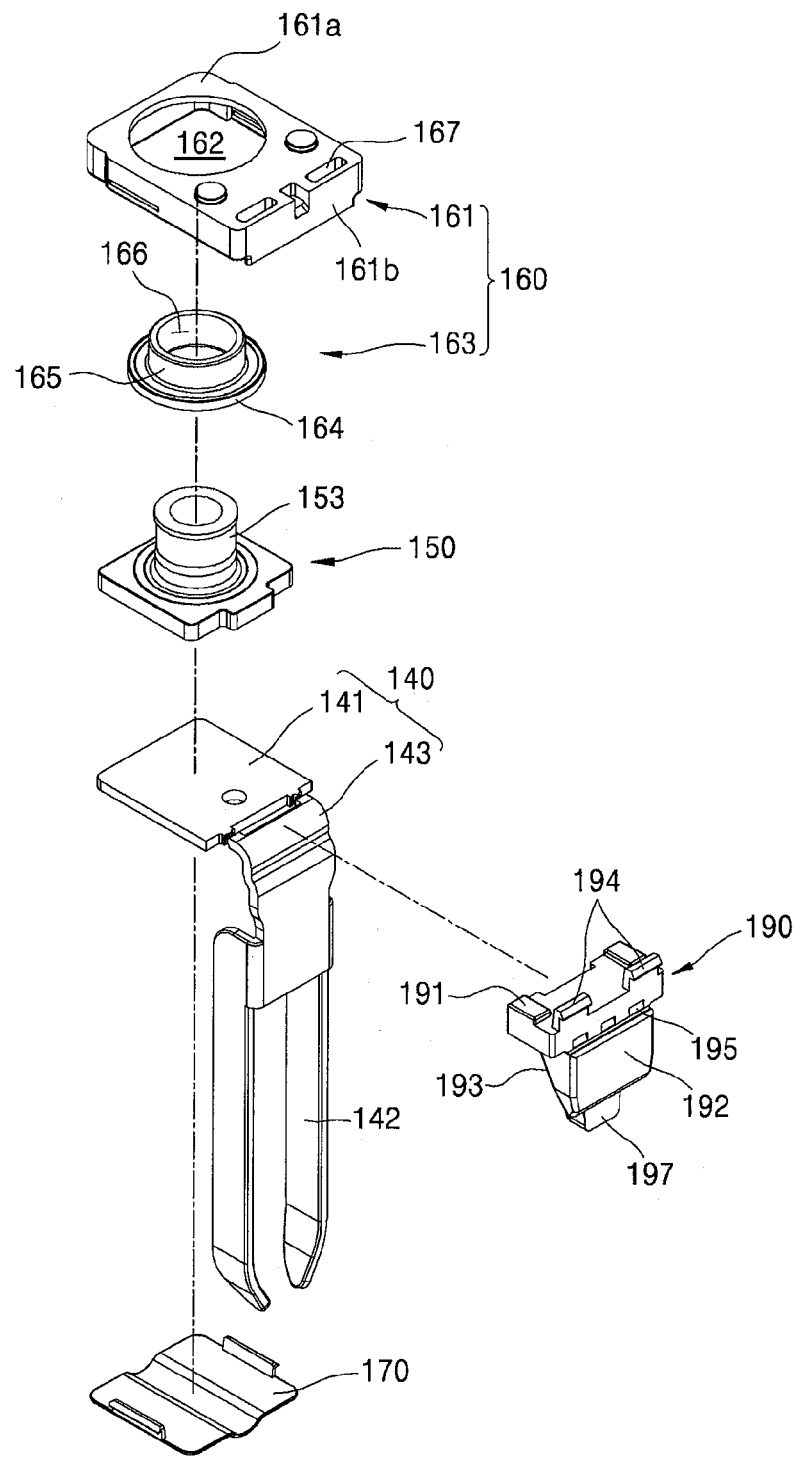
FIG. 3 is an enlarged exploded top perspective view illustrating an electrode assembly, an electrode terminal, a gasket, an insulator, and a reinforcement part of the secondary battery of FIG. 1.

This will now be described in more detail. FIG. 3 is an exploded top perspective view illustrating the electrode collector 140, the electrode terminal 150, the gasket 160, the insulator 170, and the reinforcement part 190, and FIG. 4 is an exploded bottom perspective view illustrating the electrode collector 140, the electrode terminal 150, the gasket 160, the insulator 170, and the reinforcement part 190 of FIG. 3.

Figure 4:
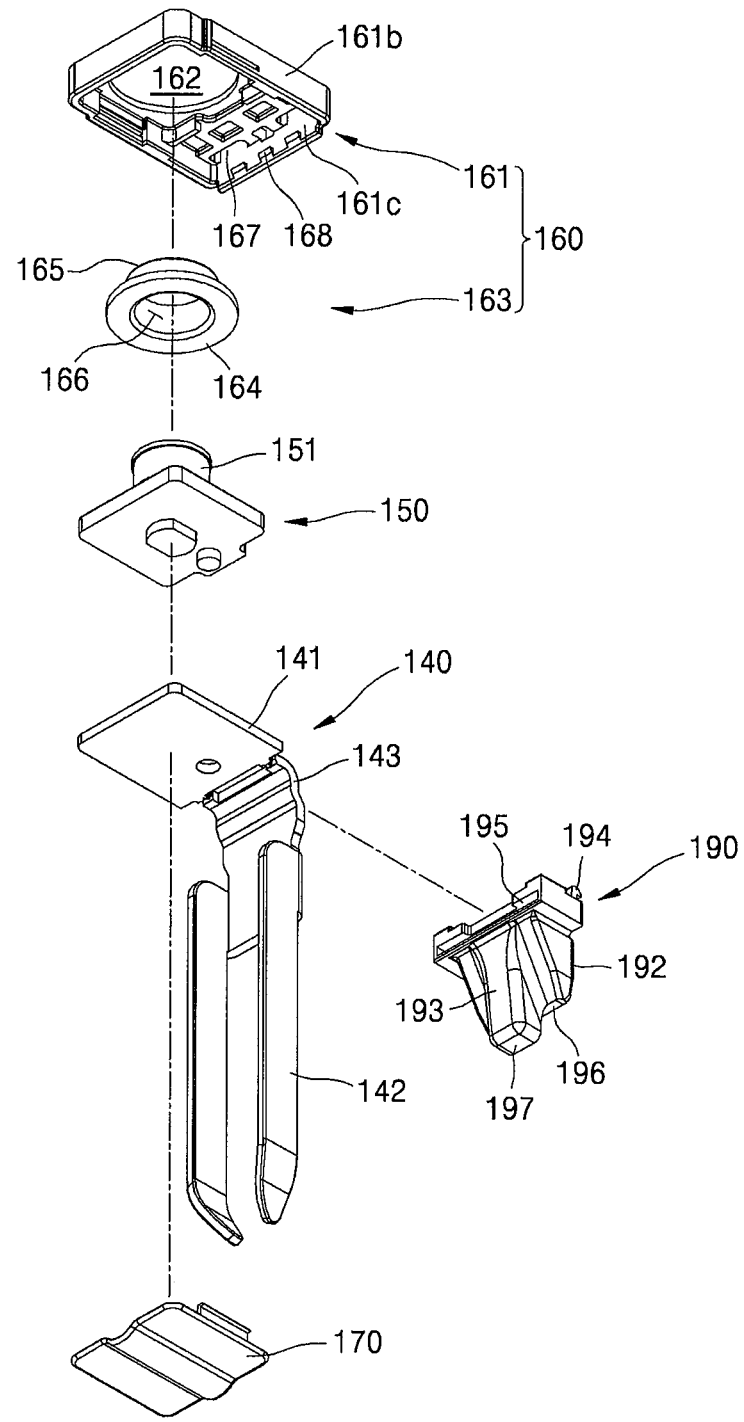
FIG. 4 is an enlarged exploded bottom perspective view illustrating the electrode assembly, the electrode terminal, the gasket, the insulator, and the reinforcement part of the secondary battery of FIG. 1.

Referring to FIGS. 3 and 4, the gasket 160 includes a gasket housing 161. The gasket housing 161 includes a flat housing base 161a and sidewalls 161b bent downward from edges of the flat housing base 161a.

A gasket opening 162 is formed in the flat housing base 161a. A seal 163 is coupled to the gasket opening 162. The seal 163 includes a circular seal base 164 and a seal protrusion 165 extending upward from the seal base 164. The seal protrusion 165 has a cylindrical shape with a cavity 166.

The seal 163 is inserted in an inner space of the gasket housing 161. Then, an upper surface of the seal base 164 is brought into contact with an inner surface of the housing base 161a, and the seal protrusion 165 protrudes upward from the gasket housing 161 through the gasket opening 162.

The cavity 166 of the seal protrusion 165 is a passage in which the electrode protrusion 153 forming a portion of the electrode terminal 150 is inserted. The electrode terminal 150 is inserted into the cavity 166 of the seal protrusion 165 from the bottom side of the gasket 160 and protrudes upward from the gasket 160. The electrode protrusion 153 is inserted in the terminal opening 121 (refer to FIG. 2) formed in the cap plate 120. Then, the seal protrusion 165 is located between an outer surface of the electrode protrusion 153 and an inner surface of the cap plate 120 in which the terminal opening 121 is formed so as to insulate the cap plate 120 and the electrode terminal 150 from each other.

At least one coupling opening 167 (a first opening) is formed in a side of the gasket housing 161 (in other words, in an edge portion of the housing base 161a). In the current embodiment, two coupling openings 167 are formed. The coupling openings 167 are formed in an edge portion of the housing base 161a and spaced from each other.

At least one gasket protrusion 168 is formed on an inner wall 161c of the gasket housing 161. The gasket protrusion 168 protrudes from an inner wall 161c of a sidewall 161b bent downward from the edge portion of the housing base 161a in which the coupling openings 167 are formed. In the current embodiment, three gasket protrusions 168 protrude from a lower end portion of the sidewall 161b and are spaced from each other. The positions of the gasket protrusions 168 are not limited to particular positions.

The reinforcement part 190 has a structure attachable to the gasket 160. The reinforcement part 190 includes a body 191. The body 191 has a thickness. The body 191 includes a first surface 192 and a second surface 193 spaced from the first surface 192 in a horizontal display by the thickness. The first surface 192 and the second surface 193 are opposite surfaces.

At least one hook 194 is formed on the first surface 192 of the body 191. The hook 194 protrudes upward from an upper edge of the first surface 192. A plurality of hooks 194 may be formed on the upper edge of the first surface 192 and spaced from each other. The hooks 194 are sized to be inserted in the coupling openings 167 of the gasket housing 161.

One or more coupling openings 195 (second openings) are formed in the first surface 192 of the body 191. The gasket protrusions 168 of the gasket housing 161 may be coupled to the coupling openings 195. When the hooks 194 are coupled to the coupling openings 167 of the gasket housing 161, the gasket protrusions 168 may be coupled to the coupling openings 195 of the body 191.

The coupling openings 195 of the body 191 are sized to accommodate the gasket protrusions 168 of the gasket housing 161 therein. The number of the coupling openings 195 of the body 191 may be equal to the number of the gasket protrusions 168 of the gasket housing 161. In the current embodiment, the number of the coupling openings 195 of the body 191 is three.

A passage 196 is formed in the body 191. The passage 196 extends in the body 191 from a lower end 197 of the body 191 to an upper end of the second surface 193 of the body 191. The passage 196 is formed in the body 191 so that the reinforcement part 190 may surround at least a portion of the electrode collector 140 through the passage 196.

In one embodiment, the body 191 is insert-molded on the electrode collector 140. For example, the body 191 may surround a third portion 143 of the electrode collector 140 connecting the first portion 141 and the second portion 142 bent from the first portion 141.

When the secondary battery 100 is assembled, a portion of the electrode collector 140 (in particular, the third portion 143 of the electrode collector 140) may be easily deformed due to low bending strength. To prevent this, the third portion 143 of the electrode collector 140 connecting the first portion 141 and the second portion 142 is surrounded by the body 191.

As described above, at least a portion of the electrode collector 140 is surrounded by the body 191. In the current embodiment, the electrode collector 140 and the reinforcement part 190 are coupled as a unit by insert molding.

However, the electrode collector 140 and the reinforcement part 190 may be coupled by other coupling methods. For example, a hook formed on the electrode collector 140 may be coupled to a hook coupling opening formed in the reinforcement part 190, or a hook coupling opening formed in the electrode collector 140 may be coupled to a hook formed on the reinforcement part 190.

In another example, a guide formed on the electrode collector 140 may be slid on and coupled to a guide groove formed in the reinforcement part 190, or a guide groove formed in the electrode collector 140 may be coupled to a guide formed on the reinforcement part 190.

In another example, the electrode collector 140 and the reinforcement part 190 may be coupled by a combination of a hook coupling method and a sliding coupling method.

In one embodiment, the electrode collector 140 and the reinforcement part 190 are not limited to a particular coupling method but may be coupled to each other by any coupling method as long as the bending structure of at least a portion of the electrode collector 140 is enhanced.

The electrode collector 140, the electrode terminal 150, the gasket 160, the insulator 170, and the reinforcement part 190 are coupled as follows.

Figure 5:
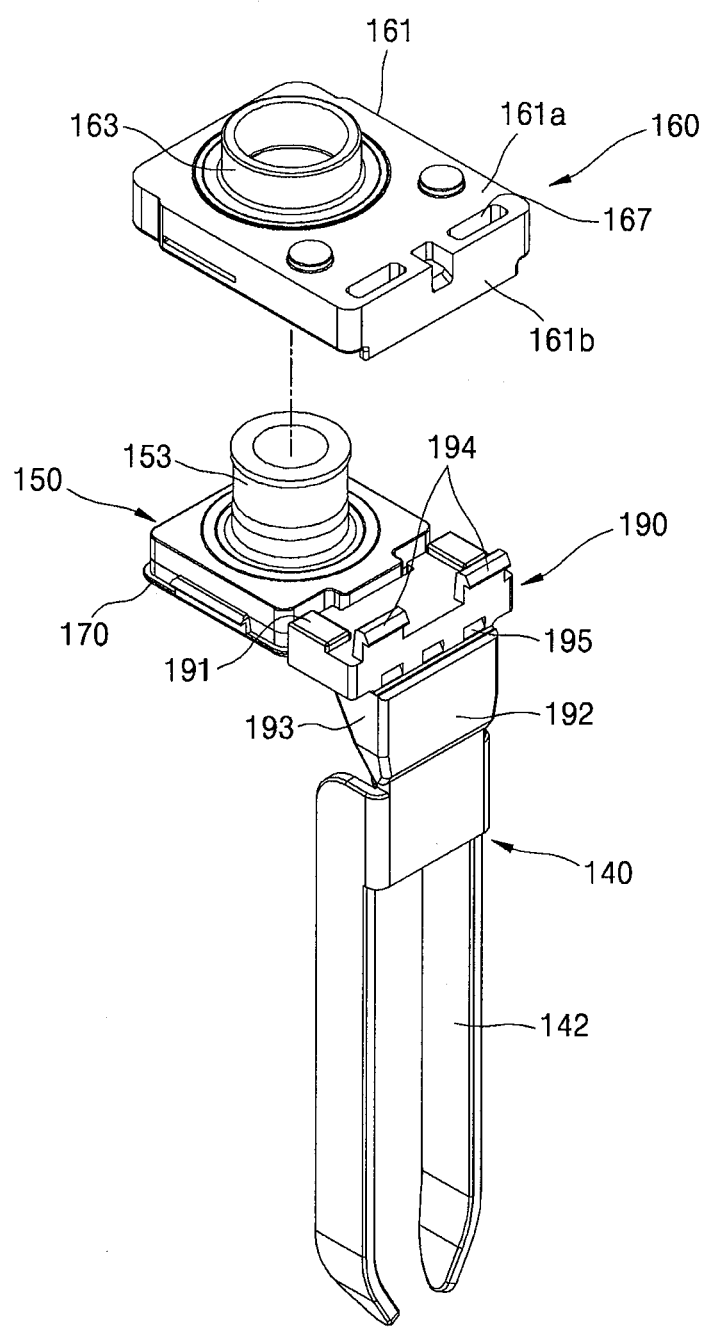
FIG. 5 is a perspective view illustrating a disassembled state of the gasket and the reinforcement part of the secondary battery of FIG. 1.
Figure 6:
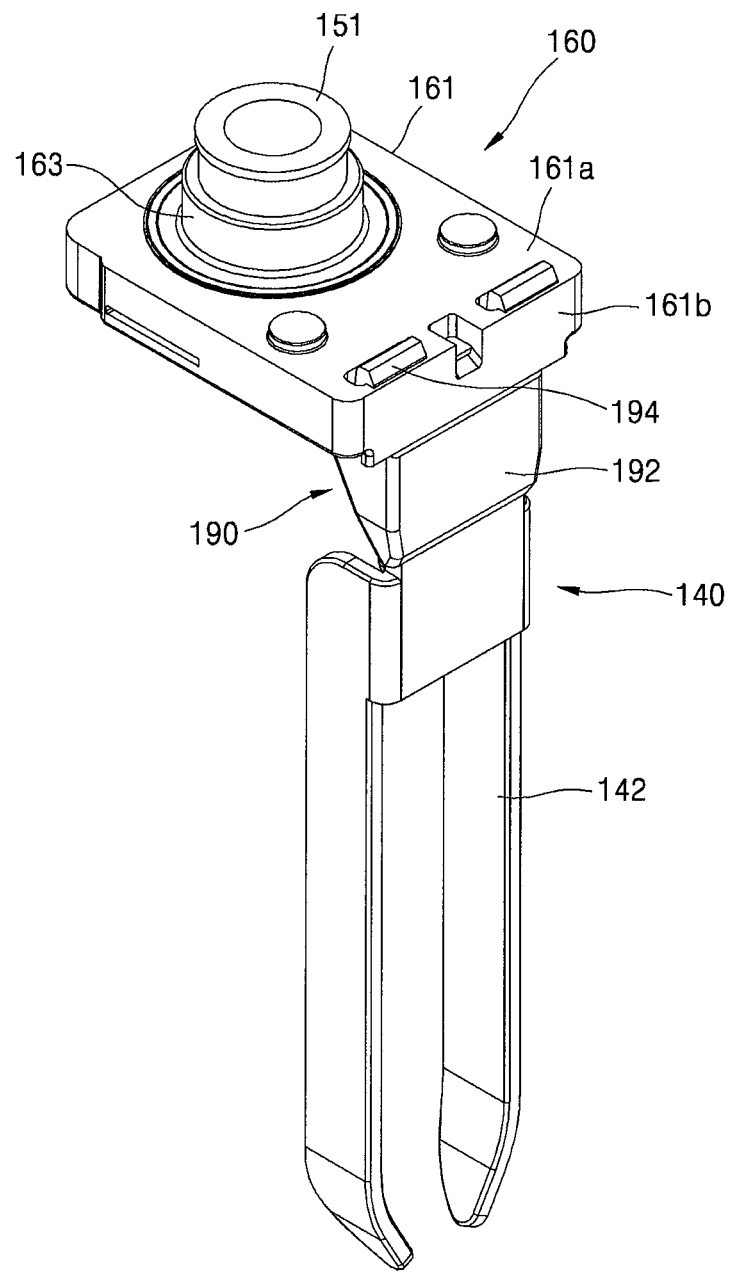
FIG. 6 is a perspective view illustrating an assembled state of the gasket and the reinforcement part of the secondary battery of FIG. 1.

FIG. 5 is a view illustrating a disassembled state of the gasket 160 and the reinforcement part 190, and FIG. 6 is a view illustrating an assembled state of the gasket 160 and the reinforcement part 190.

Referring to FIGS. 5 and 6, the body 191 of the reinforcement part 190 is insert-molded on the third portion 143 connecting the first portion 141 and the second portion 142 of the electrode collector 140.

The hooks 194 protruding from the upper edge of the first surface 192 may be parallel with the third portion 143 connecting the first portion 141 and the second portion 142 of the electrode collector 140, and are pointed outward from the electrode collector 140. The coupling openings 195 formed in the body 191 are arranged outward from the electrode collector 140.

In this way, the body 191 surrounds at least a portion of the electrode collector 140, and the body 191 and the electrode collector 140 are joined as a unit.

An upper surface of the first portion 141 of the electrode collector 140 contacts a lower surface of the electrode terminal 150. A lower surface of the first portion 141 of the electrode collector 140 contacts an upper surface of the insulator 170.

The seal 163 is coupled to the gasket housing 161 of the gasket 160. The seal 163 is inserted in an inner space of the gasket housing 161. In this state, the upper surface of the seal base 164 of the seal 163 contacts the inner surface of the housing base 161a of the gasket housing 161, and the seal protrusion 165 of the seal 163 protrudes upward from the gasket housing 161 through the gasket opening 162.

As the seal 163 is coupled to the gasket housing 161, the structure of the gasket 160 is completed. Alternatively, the gasket housing 161 and the seal 163 may be formed as a unit by injection molding.

The reinforcement part 190 is coupled to the gasket 160. An upper portion of the reinforcement part 190 insert-molded on the electrode collector 140 is inserted in the inner space of the gasket housing 161. The hooks 194 formed on the body 191 of the reinforcement part 190 are inserted into the coupling openings 167 formed in an edge portion of the housing base 161a of the gasket housing 161, and then, the hooks 194 protrude upward from the gasket housing 161. The protruding hooks 194 are caught on an outer surface of the housing base 161a so that the hooks 194 may be fixed to the gasket housing 161.

Additionally, in the inner space of the gasket housing 161, the gasket protrusions 168 protruding from the inner wall 161c of the gasket housing 161 are coupled to the coupling openings 195 formed in the first surface 192 of the body 191.

As such, since the reinforcement part 190 is coupled to the gasket 160 by a double coupling structure, the reinforcement part 190 may be securely fixed to the gasket 160. Since the third portion 143 of the electrode collector 140 connecting the first portion 141 and the second portion 142 and vulnerable to bending is insert-molded in the reinforcement part 190, a portion of the electrode collector 140 is located between the gasket 160 and the reinforcement part 190 when the reinforcement part 190 is coupled to the gasket 160. Therefore, structural stability may be improved.

As described above, according to one or more of the above embodiments of the present invention, electrical and mechanical coupling of elements of the secondary battery may be stably maintained.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising:
    a case;
    a cap plate coupled to the case;
    at least one electrode assembly accommodated in the case, the electrode assembly comprising a positive electrode plate, a negative electrode plate, and a separator located between the positive and negative electrode plates;
    an electrode terminal protruding outward from the cap plate;
    an electrode collector comprising a first portion coupled to the electrode terminal, a second portion coupled to the electrode assembly, and a third portion being bent and extending between the first portion and the second portion;
    a gasket surrounding the electrode terminal; and
    a reinforcement part coupled to the gasket such that the reinforcement part extends around at least three sides of the third portion of the electrode collector to prevent the electrode collector from bending in a direction away from the electrode assembly, wherein the reinforcement part is molded to accommodate the third portion of the electrode collector.

2. The secondary battery of claim 1, wherein at least one first opening is formed in the gasket,
    wherein at least one hook is formed on the reinforcement part, and wherein the hook penetrates the first opening and is coupled to the gasket.

3. The secondary battery of claim 2, wherein the gasket has an inner space, and wherein the hook is coupled to an outer surface of the gasket after passing through the first opening from the inner space.

4. The secondary battery of claim 2, wherein at least one gasket protrusion is formed on the gasket, at least one second opening is formed in the reinforcement part, and the gasket protrusion is coupled to the at least one second opening.

5. The secondary battery of claim 4, wherein the gasket protrusion protrudes from an inner wall of the gasket.

6. The secondary battery of claim 4, wherein the at least one second opening is formed in a surface of the reinforcement part on which the hook is formed.

7. The secondary battery of claim 1, wherein a hook and a hook coupling opening are respectively formed on the electrode collector and the reinforcement part and are coupled to each other.

8. The secondary battery of claim 1, wherein a guide and a guide groove are respectively formed on the electrode collector and the reinforcement part and are coupled to each other through sliding.

9. The secondary battery of claim 1, wherein the electrode terminal penetrates a terminal opening formed in the cap plate to protrude outward from the cap plate, and wherein the gasket is located between an outer surface of the electrode terminal and an inner surface of the cap plate in which the terminal opening is formed.

10. The secondary battery of claim 1, wherein an insulator is also located between the electrode collector and the electrode assembly.

11. The secondary battery of claim 1, wherein the gasket comprises a seal coupled to a gasket housing and surrounding the electrode terminal, the gasket housing comprising at least one first opening;

wherein the reinforcement part comprises a body and at least one hook protruding from an edge thereof; and wherein the reinforcement part is coupled to the gasket such that the hook extends through the first opening and is fixed to the gasket housing.

12. The secondary battery of claim 11, wherein the gasket housing has an inner space, and wherein the hook is coupled to an outer surface of the gasket housing after passing through the first opening from the inner space.

13. The secondary battery of claim 11, wherein at least one gasket protrusion is formed on the gasket housing, wherein at least one second opening is formed in the body, and wherein the gasket protrusion is coupled to the at least one second opening.

14. The secondary battery of claim 13, wherein the gasket protrusion protrudes from an inner wall of the gasket housing.

15. The secondary battery of claim 13, wherein the second opening is formed in a surface of the body on which the hook is formed.

16. The secondary battery of claim 11, wherein the reinforcement part is insert-molded on the electrode collector.

\* \* \* \* \*